(12) United States Patent
Kuroda

(10) Patent No.: US 6,699,053 B2
(45) Date of Patent: Mar. 2, 2004

(54) CARD CONNECTOR APPARATUS CAPABLE OF RECEIVING DIFFERENT KINDS OF CARDS

(75) Inventor: Yoshimasa Kuroda, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/183,928

(22) Filed: Jun. 25, 2002

(65) Prior Publication Data

US 2003/0013336 A1 Jan. 16, 2003

(30) Foreign Application Priority Data

Jul. 12, 2001 (JP) ........................................ 2001-212518

(51) Int. Cl.[7] .............................................. H01R 27/00
(52) U.S. Cl. ........................................ 439/218; 439/630
(58) Field of Search ................................ 439/218, 217, 439/630, 64

(56) References Cited

U.S. PATENT DOCUMENTS

| | | | |
|---|---|---|---|
| 6,004,155 A | 12/1999 | Wu | |
| 6,137,710 A | 10/2000 | Iwasaki et al. | |
| 6,386,920 B1 | * 5/2002 | Sun | ............................. 439/630 |
| 6,402,529 B2 | * 6/2002 | Saito et al. | ................. 439/630 |

FOREIGN PATENT DOCUMENTS

FR 2783622 9/1998

* cited by examiner

*Primary Examiner*—Gary Paumen
(74) *Attorney, Agent, or Firm*—Beyer Weaver & Thomas, LLP

(57) ABSTRACT

A card insertion portion provided at a front of a housing, and guide portions provided at both sides of the card insertion portion are provided, the card includes a first wide and thin card and a second card narrower and thicker than the first card, the maximum width of the card insertion portion is formed to be substantially equal to the width of the first card, the maximum thickness of the card insertion portion is formed to be substantially equal to the thickness of the second card, and the guide portion is provided with a first guide surface to come in contact with a side portion of the first card to guide the first card to an installation position, and a second guide surface to come in contact with a side portion of the second card to guide the second card to an installation position.

7 Claims, 7 Drawing Sheets

CARD CONNECTOR APPARATUS CAPABLE OF RECEIVING DIFFERENT KINDS OF CARDS

BACKGROUND OF THE INVENTION

1. Field of the Invention

The present invention relates to a structure of a card connector apparatus used for small memory cards for use in various portable information terminals, such as a portable telephone or a PC, or memory support equipments such as a digital camera or a digital AV equipment.

2. Description of the Related Art

A card connector apparatus is generally used as an expanded recording apparatus of an electronic equipment such as a personal computer or a digital camera. As a storage medium of the card connector apparatus, a PC card or a memory card has come into wide use.

The PC card or the memory card is installed in the card connector apparatus to write and read necessary information. In recent years, as small memory cards, various kinds of memory cards having different shapes, such as a long one, a short one, a thick one, or a thin one, have been developed, and various kinds of card connector apparatuses corresponding to these have been developed.

In this case, the card connector apparatus corresponds to only one kind of memory card, and only one specific memory card has been installed in one card connector apparatus. Thus, in the case where various kinds of memory cards are desired to be used, it has been necessary to prepare card connector apparatuses dedicated to the respective memory cards.

However, in the foregoing structure of the conventional card connector apparatus, in the case where various kinds of memory cards are desired to be used, since it is necessary to prepare card connector apparatuses dedicated to the respective memory cards, there have been problems that an electronic equipment in which the card connector apparatuses are mounted becomes large, and when a memory card is installed, a defect occurs that a different kind of memory card is erroneously inserted into a different card connector apparatus.

SUMMARY OF THE INVENTION

Accordingly, the invention has an object to provide a card connector apparatus which solves the foregoing problems and in which various kinds of memory cards having different shapes can be installed by the one card connector apparatus.

In order to solve the above problem, first means of the invention comprises a housing provided with a plurality of connector terminals to come in contact with contact terminal portions of a card to be inserted, a card insertion portion provided at a front of the housing, and guide portions provided at both sides of the card insertion portion, for guiding the card, and is characterized in that the card includes a first wide and thin card and a second card narrower and thicker than the first card, a maximum width of the card insertion portion is formed to be substantially equal to a width of the first card, a maximum thickness of the card insertion portion is formed to be substantially equal to a thickness of the second card, and the guide portion is provided with a first guide surface to come in contact with a side portion of the first card to guide the first card to an installation position, and a second guide surface to come in contact with a side portion of the second card to guide the second card to an installation position.

Besides, second means is characterized in that the second card is formed to have a length longer than the first card, and a plurality of first and second connector terminals capable of coming in contact with the respective contact terminal portions are disposed in the housing correspondingly to formation positions of the plurality of contact terminal portions arranged side by side at insertion side end portions of the first and the second cards.

Besides, third means is characterized in that disposal positions of the second connector terminals disposed in the housing are formed to be deeper in the card insertion portion than disposal positions of the first connector terminals, and a protrusion position of a rear edge portion of the first card installed in the housing is formed to be substantially equal to a protrusion position of a rear edge portion of the second card installed in the housing.

DETAILED DESCRIPTION OF THE PREFERRED EMBODIMENTS

Figure 1:
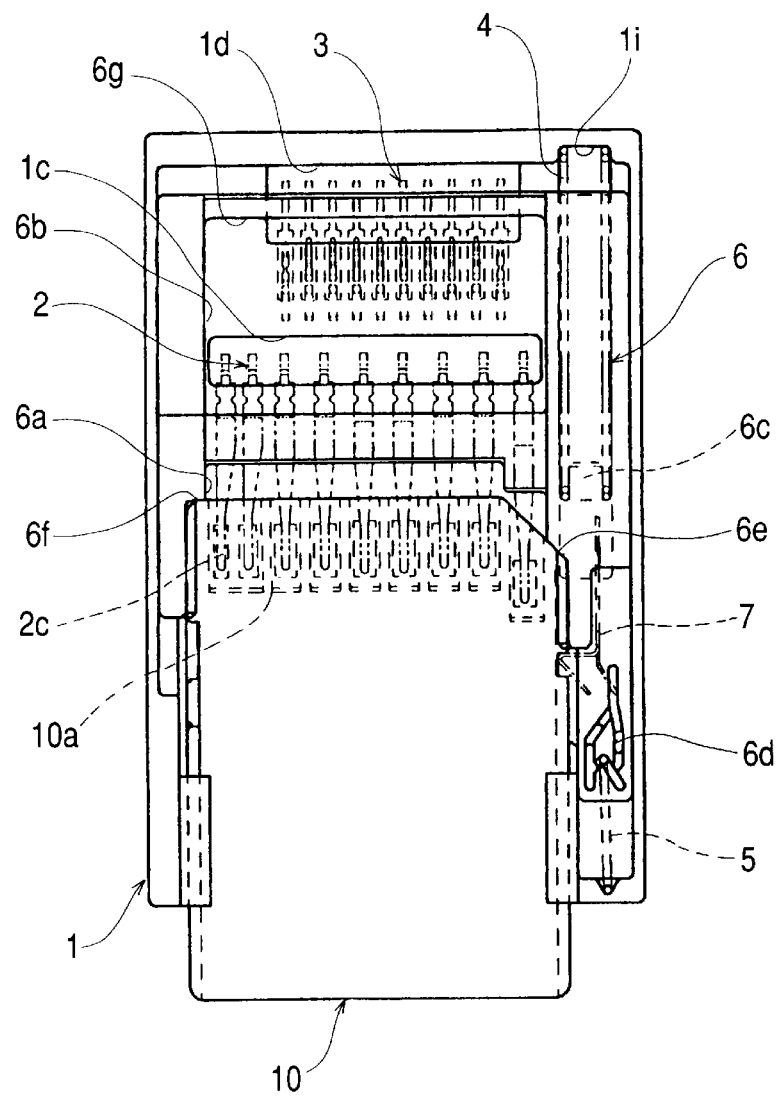
FIG. 1 is a plan view showing a card connector apparatus of an embodiment of the invention at the time of installation of a first card.
Figure 2:
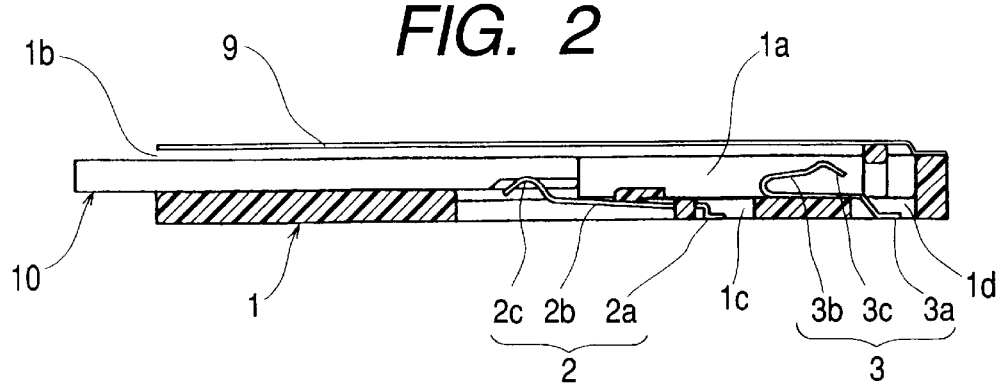
FIG. 2 is a longitudinal sectional view showing the card connector apparatus of the invention at the time of installation of the first card.
Figure 3:
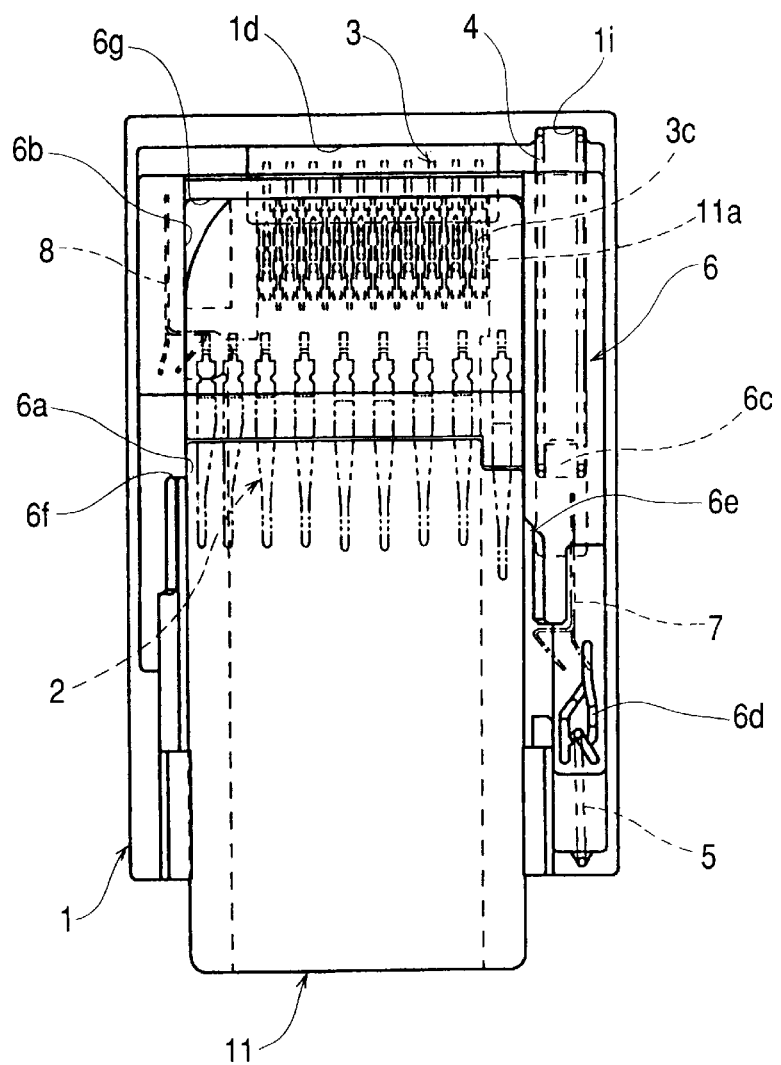
FIG. 3 is a plan view showing the card connector apparatus of the invention at the time of installation of a second card.
Figure 4:
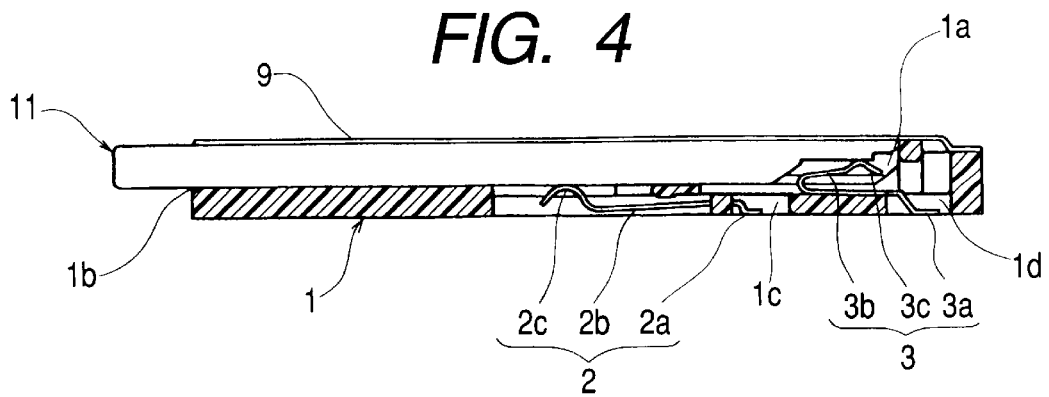
FIG. 4 is a longitudinal sectional view of the card connector apparatus of the invention at the time of installation of the second card.
Figure 5:
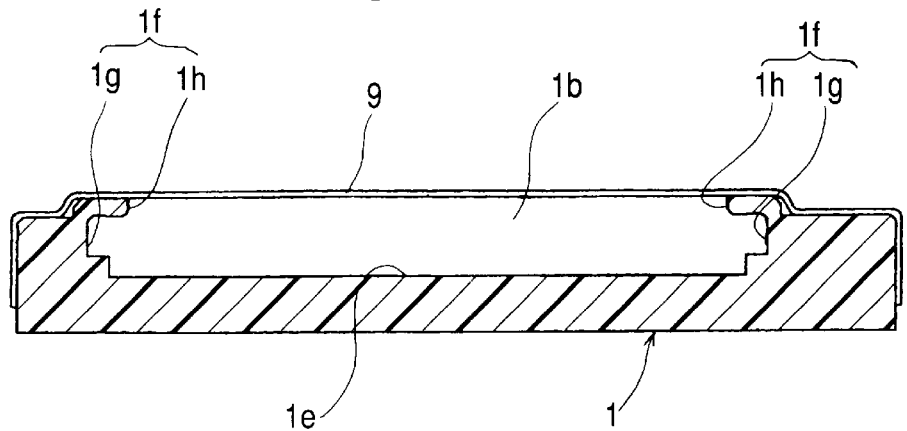
FIG. 5 is a sectional view showing a card insertion portion of a housing of the invention.
Figure 6:
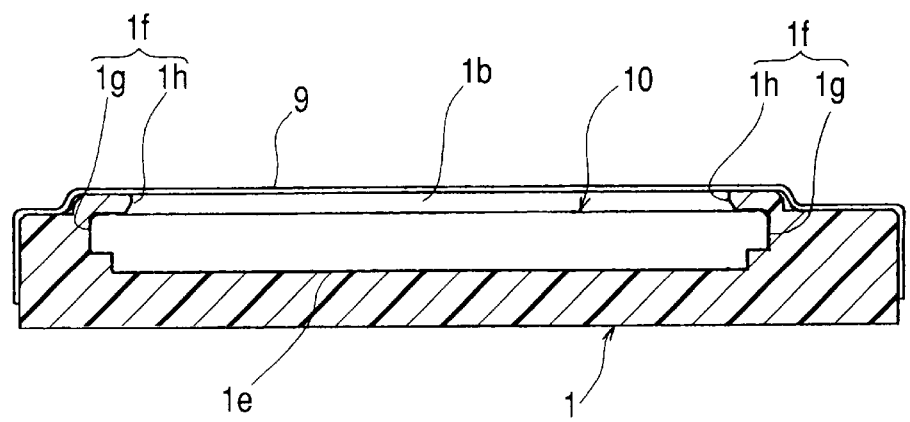
FIG. 6 is a sectional view showing a state in which a first card is installed in the card insertion portion of the housing of the invention.
Figure 7:
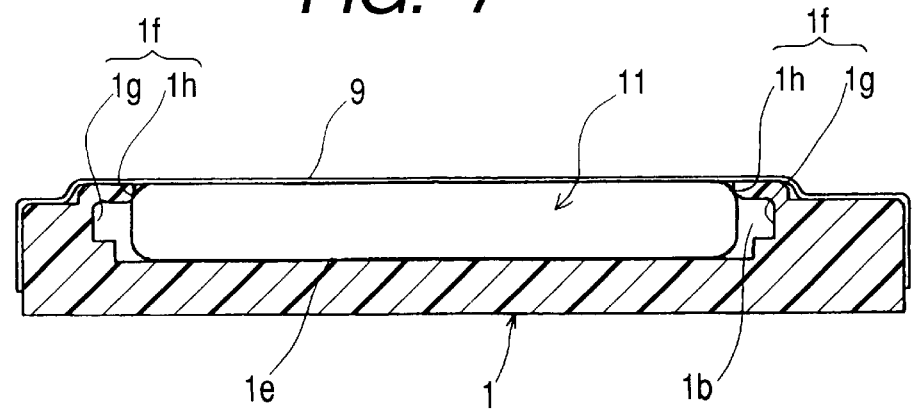
FIG. 7 is a sectional view showing a state in which a second card is installed in the card insertion portion of the housing of the invention.
Figure 8:
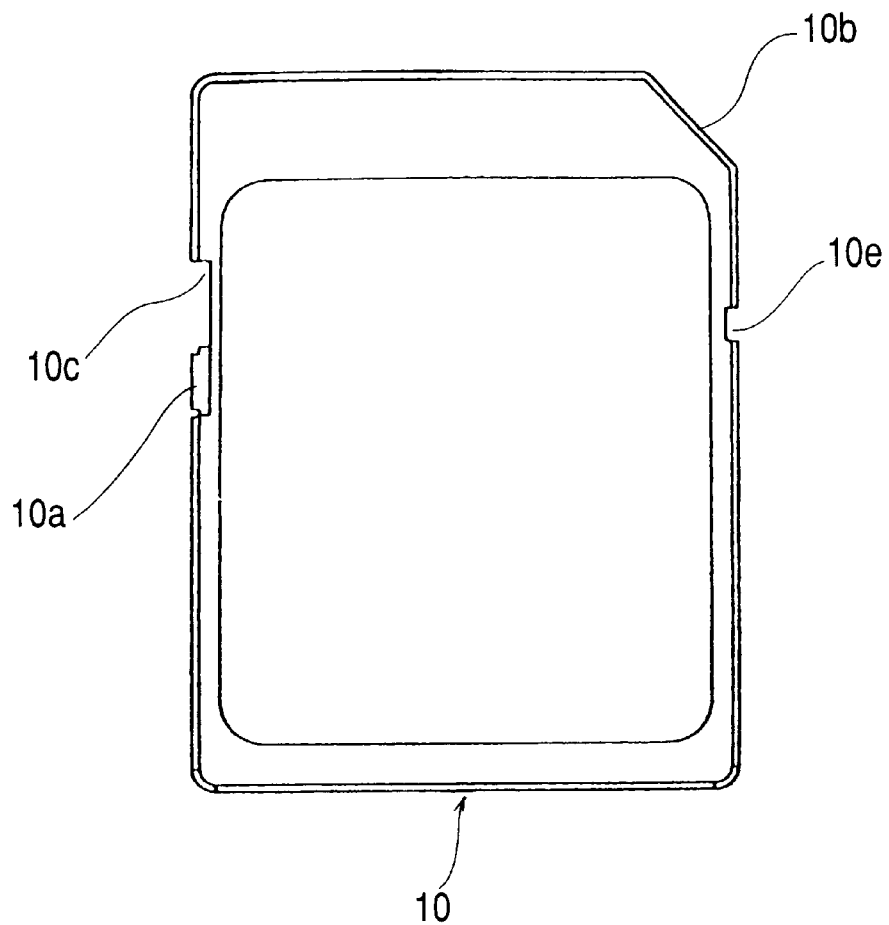
FIG. 8 is a plan view showing a first card of the invention.
Figure 9:
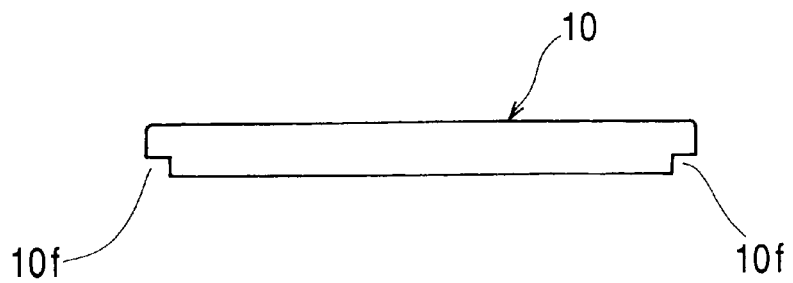
FIG. 9 is a front view showing the first card of the invention.
Figure 10:
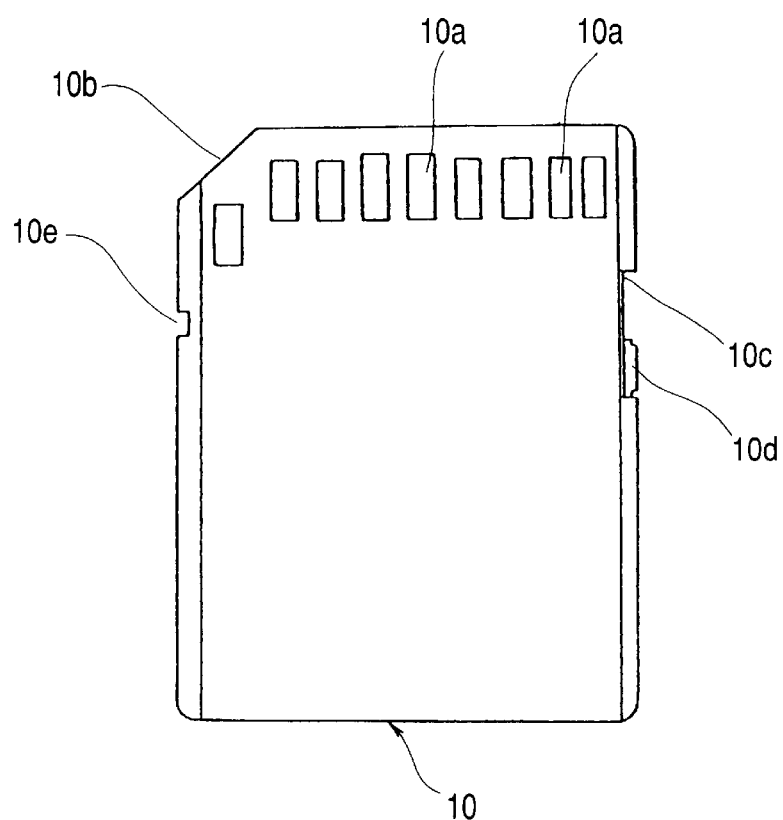
FIG. 10 is a bottom view showing the first card of the invention.
Figure 11:
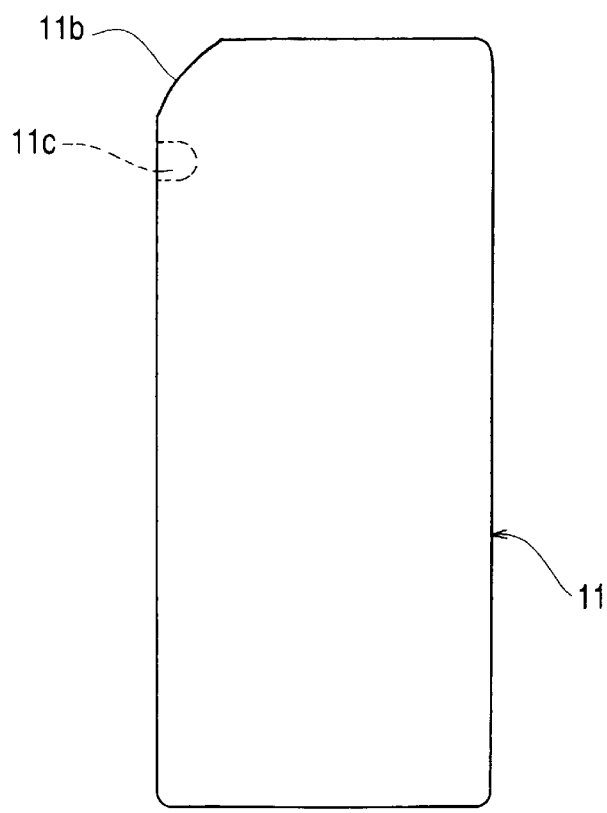
FIG. 11 is a plan view showing a second card of the invention.
Figure 12:
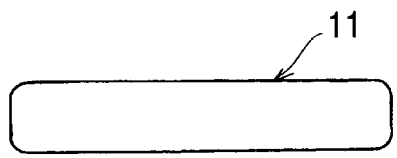
FIG. 12 is a front view showing the second card of the invention.
Figure 13:
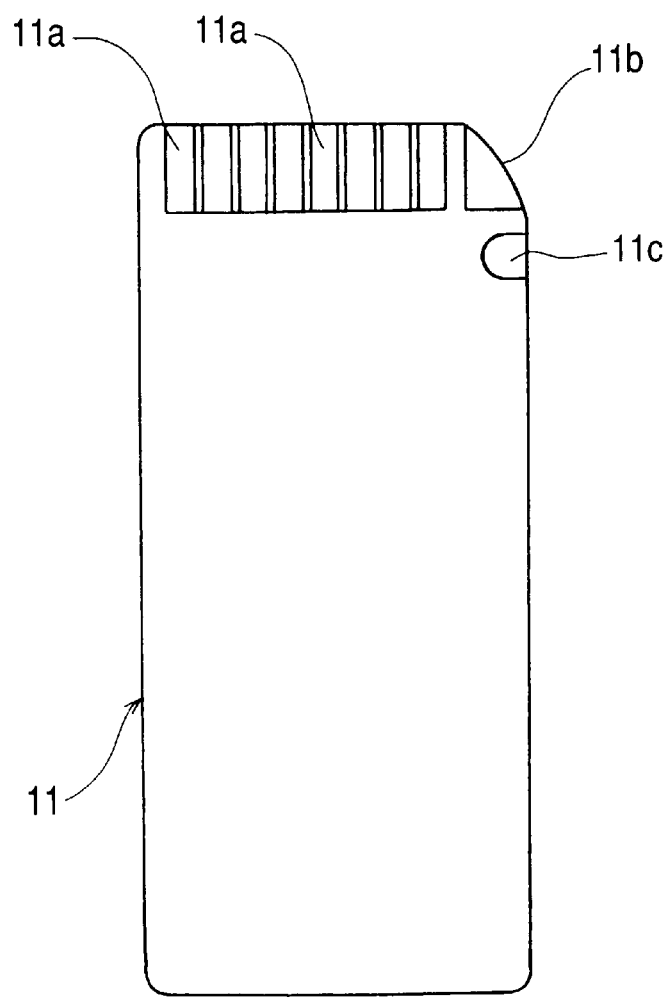
FIG. 13 is a bottom view showing the second card of the invention.
Figure 14:
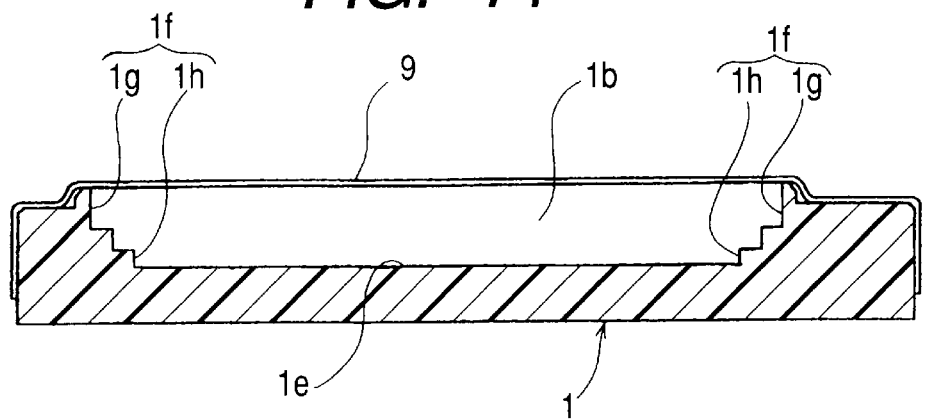
FIG. 14 is a sectional view showing a card insertion portion of a housing as another embodiment of the invention.
Figure 15:
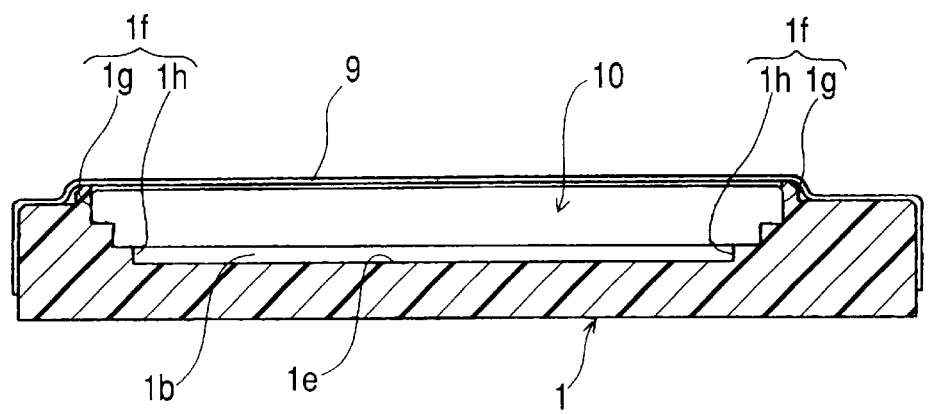
FIG. 15 is a sectional view showing a state in which a first card is installed in the card insertion portion of the housing of the invention.
Figure 16:
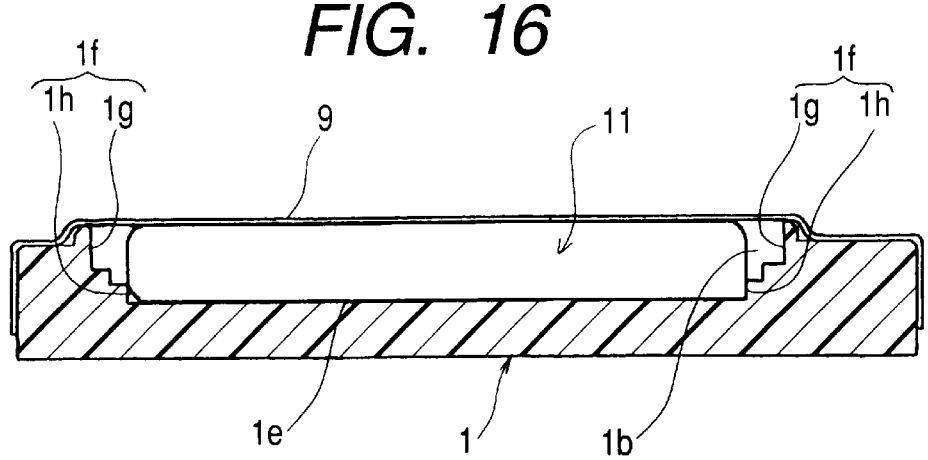
FIG. 16 is a sectional view showing a state in which a second card is installed in the card insertion portion of the housing of the invention.

Hereinafter, embodiments of the invention are shown in FIGS. 1 to 16. FIG. 1 is a plan view of a card connector apparatus at the time of installation of a first card, FIG. 2 is a longitudinal sectional view of the same, FIG. 3 is a plan view of the card connector apparatus at the time of installation of a second card, FIG. 4 is a longitudinal sectional view of the same, FIG. 5 is a sectional view of a card insertion portion of a housing, FIG. 6 is a sectional view of the same at the time of installation of a first card, FIG. 7 is a sectional view of the same at the time of installation of a second card, FIG. 8 is a plan view of a first card, FIG. 9 is a front view of the same, FIG. 10 is a bottom view of the same, FIG. 11 is a plan view of a second card, FIG. 12 is a front view of the same, FIG. 13 is a bottom view of the same, FIG. 14 is a sectional view of a card insertion portion of a housing as another embodiment, FIG. 15 is a sectional view of the same at time of insertion of a first card, and FIG. 16 is a sectional view of the same at the time of insertion of a second card.

In FIGS. 1 to 7, a housing 1 is made of insulating material such as synthetic resin and is formed into a square box shape with front and upper openings. A storage portion 1a is provided at the center of this housing 1, and a card insertion portion 1b continuous with the storage portion 1a and extending to the front of the housing 1 is formed in the housing 1.

In the storage portion 1a, a plurality of first and second connector terminals 2 and 3 made of conductive metal material are arranged side by side. The first connector terminals 2 are disposed substantially at the center position of the storage portion 1a, and each of them is formed of a flat plate-like base portion, and a connection piece 2a and a contact piece 2b formed in the directions opposite to each other from this base portion and to be bent substantially into a Z shape. The connector terminal 2 is disposed so that the connection piece 2a formed at one end side is exposed to the outside from a first opening portion 1c provided in a bottom portion of the storage portion 1a, and this connection piece 2a is soldered and fixed to a circuit pattern on an external circuit board of an electronic equipment or the like, so that signal transmission is carried out.

Besides, the contact piece 2b formed at the other end side of the base portion of the first connector terminal 2 is disposed to protrude in the storage portion 1a. Besides, a contact portion 2c to be connected to a contact terminal portion 10a of a first card 10 described later is formed at the front end side of the contact piece 2b.

The second connector terminal 3 is disposed to be deeper in the storage portion 1a than the disposal position of the first connector terminal 2, and is formed of a flat plate-like base portion, and a connection piece 3a and a contact piece 3b formed to be bent in directions opposite to each other from this base portion. The second connector terminal 3 is disposed so that the connection piece 3a formed at one end side is exposed to the outside from a second opening portion 1d provided in the bottom portion of the storage portion 1a, and this connection piece 3a is soldered and fixed to a circuit pattern on an external circuit board of an electronic equipment or the like, so that signal transmission is carried out.

Besides, the contact piece 3b formed to be bent substatially into a U shape at the other end side of the base portion of the second connector terminal 3 is disposed to protrude in the storage portion 1a. Besides, a contact portion 3c to be connected to a contact terminal portion 11a of a second card 11 described later is formed at the front end side of the contact piece 3b.

Besides, the card insertion portion 1b is provided with a flat portion 1e made of a flat plane for guiding flat portions of the first and the second cards 10 and 11 described later, and at both sides of the flat portion 1e, a pair of guide portions 1f, 1f for guiding side portions of the first and the second cards 10 and 11 described later are formed. Besides, the card insertion portion 1b is formed so that the maximum width is substantially equal to the width of the first card 10, and the maximum thickness is substantially equal to the thickness of the second card 11.

Besides, a plurality of guide surfaces made of step-like parallel surfaces are formed in the pair of guide portions 1f, 1f, and a first concave guide surface 1g to come in contact with the side portion of the first card 10 to guide the first card 10 to an installation position is formed at the center of the guide portion 1f. Besides, a second convex guide surface 1h, which is positioned inside the first concave guide surface and comes in contact with a side portion of the second card 11 to guide the second card 11 to an installation position, is formed at the upper end of the guide portion 1f.

Besides, a spring reception portion 1i for receiving a return spring 4 made of a coil spring for urging a slide member 6 described later toward an eject direction of a card is formed at one side portion of the housing 1. Besides, a lock pin 5 for holding the slide member 6 to the installation position of a card and made of a metal wire material is rotatably supported at one end side opposite to this spring reception portion 1i.

The slide member 6 is made of an insulating material such as synthetic resin and is formed into a substantially square shape, and this slide member 6 is provided with a first card reception portion 6a positioned on this side and receiving the first card 10 described later and a second card reception portion 6b positioned behind the first card reception portion 6a and receiving the second card 11 described later.

Besides, a first engagement piece 7 engaging with a positioning recess portion 10e provided at the side portion of the first card 10 to be received and made of a metal plate having a spring property is fixed at one side portion of the first card reception portion 6a, and similarly, a second engagement piece 8 engaging with a positioning recess portion 11c provided at the side portion of the second card 11 to be received and made of a metal plate having a spring property is fixed to one side portion of the second card reception portion 6b.

Besides, the slide member 6 is provided with a spring engagement portion 6c with which one end portion of the return spring 4 received in the spring reception portion 1i of the housing 1 is engaged, and further, a heart-shaped cam groove 6d with which the other end of the lock pin 5 supported at the one end side of the housing 1 is in slide contact, is formed at one end side of the slide member 6. By the cooperation of the lock pin 5 and the heart-shaped cam groove 6d, the slide member 6 is held at the installation position of a card against the urging force of the return spring 4.

A cover member 9 is formed of a conductive metal plate, and is attached to the upper surface side of the housing 1 so as to cover the opening portion of the housing 1 at the upper surface side. Incidentally, this cover member 9 is formed so as to cover the upper surfaces of the first and the second connector terminals 2 and 3 disposed in the storage portion 1a of the housing 1, and also functions as a shield plate to prevent intrusion of radiation noise or the like from the outside.

In FIGS. 8 to 10, the first card 10 contains an integrated circuit (IC) in the inside and is widely used as a recording medium. A plurality of contact terminal portions 10a are formed at one end side of one surface of the first card 10, and this contact terminal portion 10a comes in contact with the contact piece 2b of the first connector terminal 2 disposed in the storage portion 1a of the housing 1, so that various information processings to an electronic equipment connected to the outside are carried out.

Besides, in the first card 10, an oblique cut portion 10b is provided at one corner at the formation side of the contact terminal portion 10a. When the first card 10 is inserted in the first card reception portion 6a of the slide member 6, this cut portion 10b and a corner portion at the other end side are engaged with inner engagement portions 6e and 6f of the first card reception portion 6a of the slide member 6, so that the slide member 6 can be moved in the insertion direction in accordance with the insertion of the first card 10.

Besides, a concave groove portion 10c as an identification portion showing write inhibit of a card is formed in one side portion of the first card 10, and a slidable identifier 10d is provided in this concave groove portion 10c. The position of the concave groove portion 10c can be changed by sliding and moving this identifier 10d, and in accordance with this position, permission/nonpermission of writing to the card can be changed.

Besides, a positioning concave portion 10e is formed at the other side portion of the first card 10. The first engagement piece 7 provided at the one side portion of the first card reception portion 6a and having the spring property is engaged with this concave portion 10e, so that the first card 10 is held in the first card reception portion 6a of the slide member 6.

Incidentally, long cut groove portions 10f are formed at both end portions of the first card 10 at the lower surface side, and the maximum width size except for this cut groove portions 10f is formed to be a little wide, whereas the maximum thickness size is formed to be a little thin.

In FIGS. 11 to 13, the second card 11 contains an integrated circuit (IC) in the inside and is widely used as a recording medium. A plurality of contact terminal portions 11a are formed at one end side of one surface of the second card 11, and the contact terminal portions 11a come in contact with the contact pieces 3b of the second connector terminals 3 disposed in the storage portion 1a of the housing 1, so that various information processings to an electronic equipment connected to the outside is carried out.

Besides, a cut portion 11b made of an oblique surface is formed at one end portion of the second card 11, and a positioning concave portion 11c is formed at one side portion of the second card 11 to be spaced a definite distance apart from this cut portion 11b. When the second card 11 is inserted into the second card reception portion 6b of the slide member 6, the second engagement piece 8 provided at the one side portion of the second card reception portion 6b and having the spring property is engaged with the concave portion 11c, so that the second card 11 is held in the second card reception portion 6b of the slide member 6.

When the second card 11 is inserted in the second card reception portion 6b of the slide member 6, a front edge portion of the second card 11 comes in contact with a front engagement portion 6g of the second card reception portion 6b of the slide member 6, so that the slide member 6 can be moved in the insertion direction in accordance with the insertion of the second card 11.

Incidentally, the second card 11 is formed to be a substantially rectangular parallelepiped, and as compared with the first card 10, the maximum width size is formed to be a little narrow, whereas the maximum thickness size is formed to be a little thick. Besides, the length in the insertion direction is longer than the first card 10 and is formed to be long.

Like the above structure, in the case where the first card 10 and the second card 11 different from each other in shape are inserted in the card insertion portion 1b of the housing 1, in the structure of the above embodiment, as shown in FIGS. 5 to 7, the card insertion portion 1b is formed so that the maximum width is substantially equal to the first card 10 which is wide and thin, and the maximum thickness is substantially equal to the second card 11 which is narrow and thick, so that the first and the second cards 10 and 11 can be inserted.

Besides, in this case, the pair of guide portions 1f, 1f are formed at both sides of the card insertion portion 1b, and the guide portion 1f is provided with the first concave guide surface 1g to come in contact with the side portion of the first card 10 to guide the first card 10 to the installation position, and the second convex guide surface 1h to come in contact with the side portion of the second card 11 to guide the second card 11 to the installation position, so that plural kinds of cards different from one another in shape can be smoothly and certainly guided to the installation positions of the cards.

Besides, the second card 11 is longer than the first card 10 in the insertion direction and is formed to be long, and the first connector terminals 2 to come in contact with the contact terminal portions 10a of the first card 10 and the second connector terminals 3 to come in contact with the contact terminal portions, 1a of the second card 11 are disposed in the storage portion 1a of the housing 1 at positions different in the insertion direction of the card and correspondingly to the formation positions of the contact terminal portions 10a and 11a, so that plural kinds of cards having different shapes can be certainly brought into contact with the connector terminals of the connector apparatus for installation of these.

Besides, the disposal position of the second connector terminal 3 disposed in the storage portion 1a of the housing 1 is formed to be deeper in the card insertion portion than the disposal position of the first connector terminal 2, and the protrusion position of the rear edge portion of the first card 10 installed in the housing 1 becomes substantially equal to the protrusion position of the rear edge portion of the second card 11 installed in the housing 1, and accordingly, even in the case where plural kinds of cards having different shapes are inserted in the same card connector apparatus, the protrusion positions do not become irregular and the appearance becomes excellent.

FIGS. 14 to 16 show another embodiment of the card insertion portion 1b, and in this case, a difference from the structure shown in FIGS. 5 to 7 is that the structure of the pair of guide portions 1f, 1f formed at both sides of the card insertion portion 1b is a little different.

In this case, the card insertion portion 1b is the same in that the maximum width is formed to be substantially equal to the width of the first card 10, and the maximum thickness is formed to be substantially equal to the thickness of the second card 11, however, in the pair of guide portions 1f, 1f, a first concave guide surface 1g to come in contact with the side portion of the first card 10 to guide the first card 10 to the installation position is formed at the upper end side, and a second convex guide surface 1h, which is positioned inside the first concave guide surface 1g and comes in contact with the side portion of the second card 11 to guide the second card 11 to the installation position, is formed at the lower end side.

Also in the above structure, in the case where the first card 10 and the second card 11 having different shapes are inserted into the card insertion portion 1b of the housing 1, the card insertion portion 1b is formed so that the maximum width is substantially equal to the width of the first card 10 which is wide and thin, and the maximum thickness is substantially equal to the thickness of the second card 11 which is narrow and thick, and accordingly, the first and the second cards 10 and 11 can be inserted.

Besides, also in this case, the pair of guide portions 1f, 1f are formed at both the sides of the card insertion portion 1b, and the guide portion 1f is provided with the first concave guide surface 1g to come in contact with the side portion of the first card 10 to guide the first card 10 to the installation position, and the second convex guide surface 1h to come in contact with the side portion of the second card 11 to guide the second card 11 to the installation position, so that plural kinds of cards having different shapes can be smoothly and certainly guided to the installation positions of the cards.

Incidentally, in the invention, the structure of the card insertion portion 1b is not limited to the structure of the embodiment, and it is sufficient if the maximum width is formed to be substantially equal to the width of the first card 10 which is wide and thin, and the maximum thickness is formed to be substantially equal to the thickness of the second card 11 which is narrow and thick, and the shapes of the first and the second guide portions 1g and 1h formed in the guide portion if can be modified variously, and also in this case, it is needless to say that the same effect as the above-mentioned contents can be obtained.

As described above, the card connector apparatus of the invention comprises a housing provided with a plurality of connector terminals to come in contact with contact terminal portions of a card to be inserted, a card insertion portion provided at a front of the housing, and guide portions provided at both sides of the card insertion portion, for guiding the card, in which the card includes a first wide and thin card and a second card narrower and thicker than the first card, a maximum width of the card insertion portion is formed to be substantially equal to a width of the first card, a maximum thickness of the card insertion portion is formed to be substantially equal to a thickness of the second card, and the guide portion is provided with a first guide surface to come in contact with a side portion of the first card to guide the first card to an installation position, and a second guide surface to come in contact with a side portion of the second card to guide the second card to an installation position, whereby the plural kinds of first and second cards having different shapes can be inserted, and the plural kinds of cards having different shapes can be smoothly and certainly guided to the installation positions of the cards.

Besides, the second card is formed to have a length longer than the first card, and a plurality of first and second connector terminals capable of coming in contact with the respective contact terminal portions are disposed in the housing correspondingly to formation positions of the plurality of contact terminal portions arranged side by side at insertion side end portions of the first and the second cards, whereby the contact terminal portions of plural kinds of cards having different shapes can be certainly brought into contact with the connector terminals of the connector apparatus for insertion of these.

Besides, a disposal position of the second connector terminal disposed in the housing is formed to be deeper in the card insertion portion than a disposal position of the first connector terminal, and a protrusion position of a rear edge portion of the first card installed in the housing is formed to become substantially equal to a protrusion position of a rear edge portion of the second card installed in the housing, whereby even in the case where plural kinds of cards having different lengths and shapes are installed in the same card connector apparatus, the protrusion positions do not become irregular and the appearance becomes excellent.

What is claimed is:

1. A card connector apparatus for a card which is one of a first card having a first width and a first thickness, and a second card having a second width and a second thickness where the first width is larger than the second width, and the second thickness is larger than the first thickness, comprising:

a housing having an opening in a top surface, the opening communicating with a storage portion for storing the card;

a card insertion portion which is contiguous with the storage portion and through which the card is inserted into the storage portion; and guide portions provided at both sides of the card insertion portion, for guiding the card, wherein
   the opening in the top surface of the housing is covered with a cover member,
   a maximum width of the card insertion portion is substantially equal to the first width,
   a maximum thickness of the card insertion portion is substantially equal to the second thickness,
   the guide portion is provided with a first guide surface to come in contact with a side portion of the first card to guide the first card to an installation position, and a second guide surface to come in contact with a side portion of the second card to guide the second card to an installation position, and
   the cover member comes in contact with a top surface of the card and guides the card in the vertical direction when the card is inserted into the card insertion direction.

2. A card connector apparatus as set forth in claim 1, wherein the second card has a length longer than the first card, and a plurality of first and second connector terminals capable of coming in contact with the respective contact terminal portions are disposed in the housing correspondingly to formation positions of the plurality of contact terminal portions arranged side by side at insertion side end portions of the first and the second cards.

3. A card connector apparatus as set forth in claim 2, wherein a disposal position of the second connector terminal disposed in the housing is deeper in the card insertion portion than a disposal position of the first connector terminal, and a protrusion position of a rear edge portion of the first card installed in the housing is substantially equal to a protrusion position of a rear edge portion of the second card installed in the housing.

4. A card connector apparatus as set forth in claim 1, wherein the cover member is composed of a conductive metal.

5. A card connector apparatus as set forth in claim 1, wherein the second card is longer than the first card in the insertion direction, a first connector terminal and a second connector terminal are disposed in the storage portion at different positions along the insertion direction in correspondence with the first card and the second card, respectively, the first connector terminal being positioned in front of the second connector terminal, and the storage portion has a first opening portion in the bottom surface, one end of the first connector terminal being exposed to the outside from the first opening portion.

6. A card connector apparatus as set forth in claim 5, wherein the storage portion has a second opening portion in the bottom surface, one end of the second connector terminal being exposed to the outside from the second opening portion.

7. A card connector apparatus for a card which is one of a first card having a first width and a first thickness, and a second card having a second width and a second thickness where the first width is larger than the second width, and the second thickness is larger than the first thickness, comprising:

a housing having a storage portion for storing the card; and a card insertion portion which is continuous with the storage portion and through which the card is inserted into the storage portion, wherein a maximum width of the card insertion portion is substantially equal to a width of the first card, a maximum thickness of the card insertion portion is substantially equal to a thickness of the second card, guide portions are provided at both sides of the card insertion portion, for guiding the card, a first connector terminal and a second connector terminal are disposed in the storage portion at different positions along the insertion direction in correspondence with the first card and the second card, respectively, and the storage portion has a first opening portion and a second opening portion in the bottom surface of the storage portion, one end of the first connector terminal and one end of the second connector terminal being exposed to the outside from the first opening portion and the second opening portion, respectively.

\* \* \* \* \*